US011397887B2

(12) United States Patent
Sarkar et al.

(10) Patent No.: US 11,397,887 B2
(45) Date of Patent: Jul. 26, 2022

(54) DYNAMIC TUNING OF TRAINING PARAMETERS FOR MACHINE LEARNING ALGORITHMS

(71) Applicant: Amazon Technologies, Inc., Seattle, WA (US)

(72) Inventors: Tuhin Sarkar, Cambridge, MA (US); Animashree Anandkumar, Redwood City, CA (US); Leo Parker Dirac, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 985 days.

(21) Appl. No.: 15/716,417

(22) Filed: Sep. 26, 2017

(65) Prior Publication Data

US 2019/0095785 A1  Mar. 28, 2019

(51) Int. Cl.
*G06N 20/00* (2019.01)
*G06N 3/08* (2006.01)
*G06N 3/04* (2006.01)
*G05B 13/02* (2006.01)

(52) U.S. Cl.
CPC ............ *G06N 3/08* (2013.01); *G05B 13/027* (2013.01); *G06N 3/0472* (2013.01); *G06N 20/00* (2019.01)

(58) Field of Classification Search
CPC .................................................... G06N 20/00
USPC .................................................... 706/15, 45
See application file for complete search history.

(56) References Cited

U.S. PATENT DOCUMENTS

| 10,528,866 | B1* | 1/2020 | Dai ...................... G06N 3/0445 |
| 2015/0379424 | A1 | 12/2015 | Dirac et al. |
| 2016/0224903 | A1* | 8/2016 | Talathi ..................... G06N 3/08 |
| 2016/0307098 | A1* | 10/2016 | Goel ..................... G06N 3/0454 |
| 2017/0176190 | A1* | 6/2017 | Harvey ................ G01C 21/206 |
| 2018/0159727 | A1* | 6/2018 | Liu ...................... H04L 41/0806 |
| 2018/0348013 | A1* | 12/2018 | Farahmand ............... E02B 9/00 |
| 2020/0167691 | A1* | 5/2020 | Golovin ................. G06N 7/005 |

FOREIGN PATENT DOCUMENTS

| CN | 104200087 A | 12/2014 |
| CN | 104778495 A | 7/2015 |
| WO | 2014186488 A2 | 11/2014 |

OTHER PUBLICATIONS

Bergstra et al., Random Search for Hyper-Parameter Optimization, Journal of Machine Learning Research 13 (2012) 281-305 (Year: 2012).*

(Continued)

*Primary Examiner* — David R Vincent
(74) *Attorney, Agent, or Firm* — Davis Wright Tremaine LLP

(57) ABSTRACT

A system such as a service of a computing resource service provider includes executable code that, if executed by one or more processors, causes the one or more processors to initiate a training of a machine-learning model with a parameter for the training having a first value, the training to determine a set of parameters for the model, calculate output of the training, and change the parameter of the training to have a second value during the training based at least in part on the output. Training parameters may, in some cases, also be referred to as hyperparameters.

20 Claims, 7 Drawing Sheets

(56) References Cited

OTHER PUBLICATIONS

Baydin et al., "Online Learning Rate Adaptation with Hypergradient Descent," Jun. 9, 2017, retrieved Nov. 29, 2018, from https://arxiv.org/pdf/1703.04782v2.pdf, 10 pages.
International Search Report and Written Opinion, dated Dec. 7, 2018, International Patent Application No. PCT/US2018/052493, filed Sep. 24, 2018, 19 pages.
Sarkar et al., "Dynamically Learning the Learning Rates: Online Hyperparameter Optimization," ICLR 2018 Conference Withdrawn Submission, Jan. 25, 2018, retrieved Nov. 29, 2018, from https://openreview.net/pdf?id=HJtPtdqQG, 9 pages.
Snoek et al., "Practical Bayesian Optimization of Machine Learning Algorithms," Advances in Neural Information Processing Systems 25 (NIPS 2012), Dec. 31, 2012, retrieved on Feb. 10, 2015, from http://arxiv.org/abs/1206.2944, 9 pages.
"Data Transformations Reference," Amazon Machine Learning, © Amazon Web Services, Inc. (2017), http://docs.aws.amazon.com/machine-learning/latest/dg/data-transformations-reference.html, 13 pages.
"Types of ML Models," Amazon Machine Learning, © Amazon Web Services, Inc. (2017), http://docs.aws.amazon.com/machine-learning/latest/dg/types-of-ml-models.html, 3 pages.
Raghupathy, S., "Big Data Architectural Patterns and Best Practices on AWS," AWS [Amazon Web Services] Summit, Chicago (Apr. 2016), 56 pages.
Shevchuk, Y., "Hyperparameter optimization for Neural Networks," NeuPy—Neural Networks in Python (Dec. 17, 2016), 28 pages.

\* cited by examiner

DYNAMIC TUNING OF TRAINING PARAMETERS FOR MACHINE LEARNING ALGORITHMS

BACKGROUND

Data analytics and machine-learning are utilized in many contexts to collect and analyze data to determine patterns and create models (e.g., machine-learning models) that attempt to predict future results based on past data collected. In many cases, a machine-learning algorithm is used to train a machine-learning model that is created as part of a training process. For example, neural networks are sometimes used in connection with machine-learning. In many cases, training parameters—also referred to as hyperparameters—are parameters that control various aspects of the training process which are manually set by an operator of the machine-learning algorithm (e.g., by an engineer, data scientist, or mathematician). In many cases, selecting an appropriate training parameter value is challenging because different types of data sets call for different training parameter values—for example, a high learning rate in one context may result in a better model, but in another context may perform more poorly. Accordingly, the process of selecting and tuning training parameters in the context of machine-learning is a challenging task.

BRIEF DESCRIPTION OF THE DRAWINGS

Various techniques will be described with reference to the drawings, in which.

DETAILED DESCRIPTION

Figure 1:
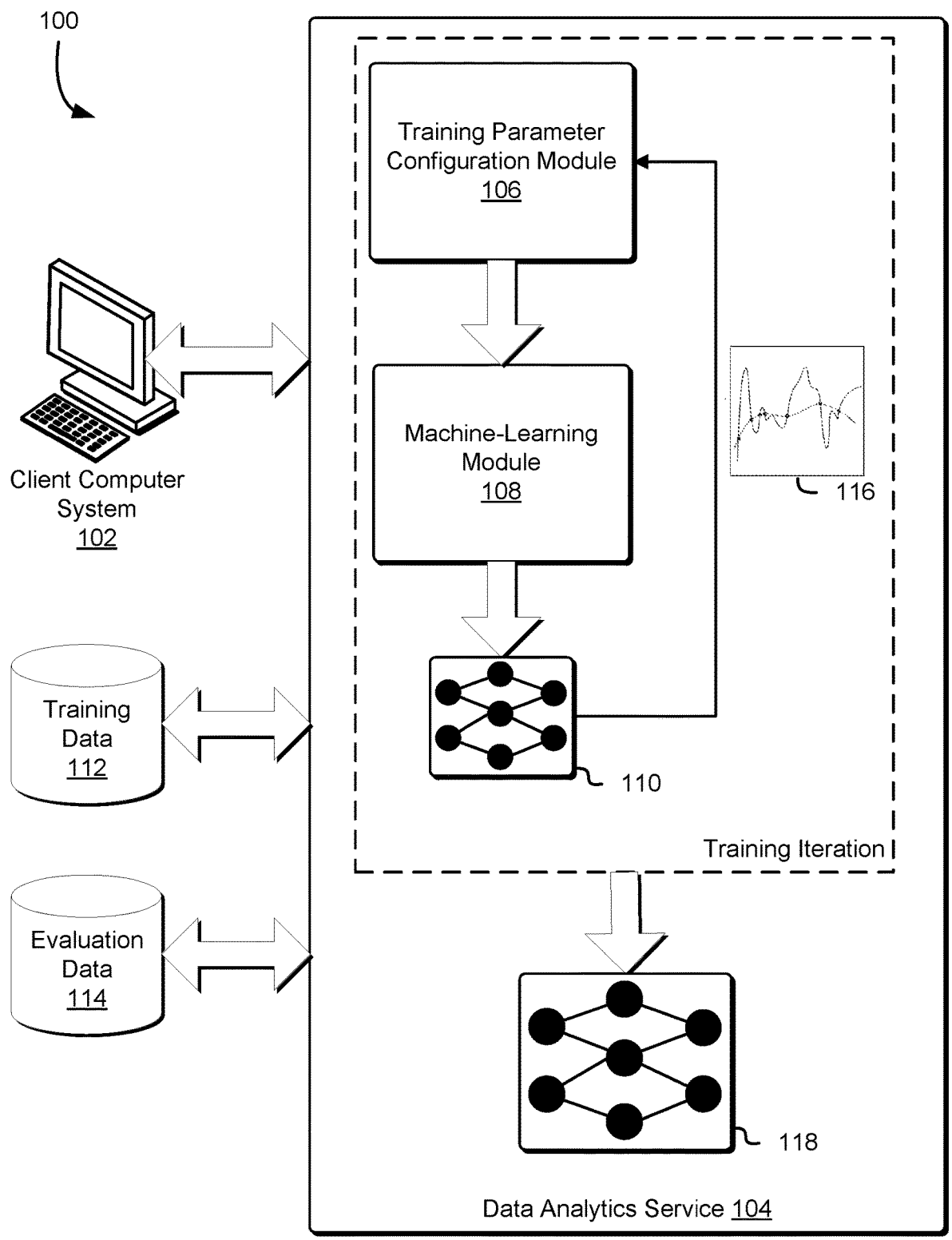
FIG. 1 illustrates a diagram of a system in which training parameters used to control the training of a machine-learning algorithm are dynamically tuned, in accordance with one embodiment.

In an embodiment, a machine-learning algorithm is used to train a machine-learning model that is created as part of a training process. In an embodiment, a training parameter or hyperparameter is a parameter that controls one or more aspects of a training process used by a machine-learning algorithm to generate a machine-learning model. A machine-learning model is, in an embodiment, represented as a model having one or more input nodes connected to one or more output nodes representing predicted outcomes where the edges between nodes each have a corresponding weight or are represented as a set of parameters and weights for computing a predicted output value given one or more inputs. Generally speaking, a model can have intermediary nodes between the input nodes and the output nodes.

In an embodiment, the training parameters or hyperparameters are dynamically adjusted during an optimization process to improve the efficiency, stability, and/or accuracy of the training process. In an embodiment, a system such as a data analytics service of a computing resource service provider receives a set of data, partitions the set into two non-overlapping subsets—one for training the machine-learning model and one for evaluating the model—and selects values for one or more training parameters that control at least part of a training process. A training parameter includes, in an embodiment, a learning rate for the model, the momentum, regularization type and amount, shuffle type, and/or other another parameter.

In an embodiment, the system initially provisions a training parameter (e.g., learning rate) with a set of initial values which are selected randomly, pseudo-randomly, or quasi-randomly over a domain of possible values. In an embodiment, a set of initial values is selected using any suitable technique such as those described above, and the machine-learning algorithm is run for a first iteration over the randomly selected values in the absence of additional information and is utilized to indicate whether a particular subset of values is expected to generate better results (e.g., information obtained from a previous optimization process). Continuing with the process, after running an iteration over the set of selected values, the system selects a value from which to continue the training process—in an embodiment, the selection is based on the value that has the highest score (e.g., an objective score which is used to evaluate the quality of the result), a score that exceeds a minimum threshold, or a blend of factors such as the run-time performance, amount of computing resources utilized, and various other factors. In an embodiment, information such as the objective score of the first iteration over each of the set of values is collected and uses a Bayesian optimization algorithm (or, more generally, any sequential model-based optimization) to incorporate the collected information in the selection of future suggestions for values in subsequent iterations. In the example discussed above, the information includes the training parameter of the other learning rates which were trained for, and the information is stored and utilized to improve future suggestions.

For example, in an embodiment, a system of a computing resource service provider selects a set of initial values for the learning rate of an artificial neural network (e.g., pseudo-randomly across a domain of values) and trains the neural network for one epoch (e.g., one iteration) for each of those learning rates. In an embodiment, after the training is complete for the first epoch, the information obtained from the learning rates are stored and, subsequently, the system uses a Bayesian optimization algorithm to generate new suggestions for learning rate values. In an embodiment, the Bayesian optimization search incorporates the stored information from the first epoch to generate the new suggestions. In an embodiment, the Bayesian optimization algorithm suggests a fixed number of suggestions of new parameters to look for, and the process is repeated until a plateau is reached in the training, and the process is reset, a new set of initial values are randomly selected, and the training process continues until an equilibrium is reached in the training process.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram of a system 100 in which an embodiment in accordance with this disclosure is implemented. In an embodiment, a client computer system 102 utilizes a data analytics service 104 to perform a machine-learning algorithm that is used to train a machine-learning model 118 that is created as part of a training process. In an embodiment, training data 112 is provided and the machine-learning algorithm and includes one or more inputs and one or more outputs that are known to be correct—for example, an input is a video of a human and a correct output is an indication of the corresponding activity that the human is performing in the activity. In an embodiment, the machine-learning algorithm utilizes training data 112 to generate a machine-learning model 118 to be used to predict output results (e.g., where the correct answer is not known a priori). In an embodiment, a machine-learning model 118 is generated by a machine-learning algorithm that receives a set of training data 112 with known input and output values, generates a model 118 that includes a set of nodes and a set of weighted edges that connect nodes, wherein a path exists from an input state to one or more output states which are the predicted outputs according to the model 118 based on a particular input or set of input parameters. In an embodiment, a machine-learning model 118 receives an input, determines, based on the input, how to traverse nodes of the model 118, and reaches an output that represents the predicted result of the model 118 based on the received input—for example, a customer of a computing resource service provider records a video, provides the video to a data analytics service of the computing resource service provider, and the data analytics service utilizes a machine-learning model 118 generated from training data 118 to predict the activity being performed in the customer's video.

In an embodiment, a data analytics service 104 is a fleet of one or more computing devices that include one or more processors and stores executable code that, if executed by the one or more processors, causes the one or more processors of the fleet to perform data analytics related services, such as generating, configuring, and evaluating machine-learning models. In an embodiment, the data analytics service 104 is implemented as a service of a computing resource service provider, such as in accordance with embodiments described elsewhere in connection with FIG. 6. In an embodiment, various aspects of the data analytics service 104 are implemented at least in part in accordance with FIG. 7. In an embodiment, the data analytics service supports a set of commands which a client of the service (e.g., the client computer system 102 illustrated in FIG. 1 or other services of a computing resource service provider), receive the commands as web API requests and provides responses in acknowledgment of the requests.

In an embodiment, a training parameter configuration module 106 is a component of the data analytics service 104 that is implemented as a software application, module, add-on, plugin and more. In an embodiment, the training parameter configuration module includes executable code that, if executed by one or more processors, causes the one or more processors to support multiple different types of machine-learning models to be utilized to predict different types of results. A binary classification model, in an embodiment, predicts a binary outcome or result—for example, predicting whether a customer will buy a product or not. In an embodiment, a binary classification model refers to a model in which an input or set of inputs is provided to a machine-learning model, and an output or result has two possible values and the model selects exactly one of the two possible values as the predicted result. A binary classification model, in an embodiment, is a machine-learning model that is generated using any suitable machine-learning algorithm, including but not limited to logistic regression algorithms.

In an embodiment, the training parameter configuration module 106 supports a multiclass classification model that predicts an outcome selected from more than two possible outcomes. In an embodiment, a multiclass classification model is a machine-learning model generated using a machine-learning algorithm that is in accordance with a multinomial logistic regression algorithm. An example of a multinomial classification model, in an embodiment, is classifying a product into one of several (i.e., more than two) categories, predicting the activity depicted in a video where the activity is selected from one of three or more possible activities, and more.

In an embodiment, the training parameter configuration module 106 supports a regression model that predicts the value of an outcome from a range of values. In an embodiment, the range of values that a regression model predicts is in the domain of integers, real numbers, or a portion thereof. For example, a regression model predicts the number of times a person will take a certification exam before receiving a passing score (i.e., the regression model generates a result that is a positive integer) given past practice test scores, the expected arrival time of an airplane based at least in part on historical travel data, present weather information, and present traffic control delay information, and more.

In an embodiment, a machine learning module 108 is a software application, program, add on, plugin, and the like, which performs one or more steps of a machine-learning algorithm and accepts, as inputs, a data source from which training data 112 is obtained, a data attribute for the target to be predicted, data transmission instructions, and training parameters to control the learning algorithms. In an embodiment, training parameters refer to hyperparameters that control the learning process and are not altered and/or predicted by a machine-learning model 118. In an embodiment, a machine-learning algorithm accepts hyperparameters as inputs to a machine-learning process, and the hyperparameters control one or more properties of the training process and, by extension, influence the generation of the machine-learning model 118. In an embodiment, the hyperparameters are specified by a client 102 of a computing resource service provider and are obtained from a separate source other than the data source of the training data 112. A machine learning module 108, in an embodiment, allows a client 102 to specify one or more of the following hyperparameters: learning rate, number of iterations per training run, shuffle type, regularization type, regularization amount, maximum model size; and maximum number of passes over training data. In an embodiment, a computing resource service provider has predefined values (e.g., default values) for one or more of the training parameters, and a client 102 can set the training parameters to a particular value via a command line interface, a web application programming interface (API), a console, any combination thereof, and more. In an embodiment, one or more training parameters are not configurable by the client 102—for example, the learning rate, in an embodiment, is configured based on the training data 112.

In an embodiment, a machine-learning model 118 refers to a model or artifact that is created by a machine-learning algorithm and used to make predictions regarding the result of new data based on the previous data that was observed by the machine-learning algorithm as part of a training process. In an embodiment, a machine-learning model is a linear regression model, a Bayesian network. More generally, the machine-learning model can be represented in any suitable manner, such as by a set of nodes and weighted edges between nodes (e.g., between two different nodes or from a node to itself).

In an embodiment, the shuffle type for training data refers to mixing up the order of data so that an optimization algorithm utilized in connection with a machine-learning algorithm does not encounter just one type of data for a large number of observations in succession. For example, in an embodiment, the optimization algorithm is a stochastic gradient descent algorithm utilized to find the maxima or minima of an objective function. In an embodiment, the machine-learning algorithm requires a shuffling type for the training data. In an embodiment, the shuffling of the training data is performed using a pseudo-random shuffling algorithm. In an embodiment, shuffling is disabled, such as in the case where a client 102 shuffles the training data by randomizing the order in which the training data is provided to the machine-learning algorithm. In an embodiment, when a machine-learning model 118 is created (e.g., via a console command), a computing resource service provider defaults the shuffling of the data to a pseudo-random shuffling technique and, regardless of the number of passes requested, the computing resource service provider shuffles the data once and only once before the training of the machine-learning model 118 is initiated. In an embodiment, the shuffling of the training data is performed using a randomizing function on a table of data that is stored in a data storage service of the computing resource service provider.

In an embodiment, the predictive performance of complex machine-learning models (e.g., those having many input attributes) suffers when the data includes a large number of patterns. Generally speaking, as the number of patterns increases, there is a corresponding likelihood that the model 118 learns unintentional data artifacts rather than the underlying data patterns. In an embodiment, overfitting refers to cases where a machine-learning model 118 does well on the training data 112 but fails to generalize well on new data. In an embodiment, regularization is utilized at least in part to reduce the amount of overfitting performed by a machine-learning algorithm by penalizing large weight values. In an embodiment, there are different types of regularization. In an embodiment, a L1 regularization reduces the number of features used in the model 118 by pushing the weights of the features that would otherwise have small weights to zero, thereby eliminating such weights from the mode; in an embodiment, a L2 regularization results in smaller overall weight values, which stabilizes the weights when there is high correlation between features. In an embodiment, the regularization types and/or regularization values are dynamically tuned using techniques described elsewhere in this disclosure.

In an embodiment, the maximum model size refers to the maximum size (e.g., in bytes) that the machine-learning algorithm generates during the training of a machine-learning model 118. In an embodiment, a default model size is defined. In an embodiment, if the computing resource service provider is unable to find enough patterns to fill the size specified by the maximum model size, a smaller model is, instead, created. For example, in an embodiment, if a maximum model size is defined (e.g., based on a default value or a custom value specified by a client 102 via a web API call) but the computing resource service provider finds a pattern that is less than the maximum size, the resulting model is smaller than the maximum model size. However, if the computing resource service provider finds more patterns than will fit into the maximum model size, the system, in an embodiment, truncates the patterns that least affect the quality of the machine-learning algorithm so as to satisfy the constraint that the maximum model size be less than (or less than or equal to) a particular value. It should be noted that the size of the data source does not necessarily imply a larger model size—generally speaking, even if a data set is large, if the patterns are few and simple, the resulting model will be small, even if the data source is large in size. In an embodiment, a log file records information related to the truncation of logs, such as when and how much of the model was truncated in accordance with the training parameter specifying the maximum model size.

In an embodiment, a training parameter specifies the maximum number of passes over the training data that is used to discover patterns in the training data. In an embodiment, making multiple passes over training data improves the machine-learning model 118 generated, at least because the additional passes are utilized to discover additional patterns. It should be noted that the improvements described in this context may be described generally so that, even though some patterns do not improve with additional passes that on average over larger data sets, there are improvements to the quality of the machine-learning model 118 (e.g., the model has higher success rates in predicting outcomes). In an embodiment, the maximum number of passes over training data is determined based at least in part on the size of the data set used to train the model—generally speaking, larger data sets that include similar data points reduce the need for a larger number of passes over the training data. Generally speaking, the higher the number of training passes, the more computational resources are needed to generate a machine-learning model. Accordingly, techniques described herein for tuning training parameters can be utilized to improve the efficiency of a computing resource service provider that provides machine-learning services by reducing the number of passes over the training data while still generating a high-quality machine-learning model.

In an embodiment, a machine-learning model 118 is created using an interface provided by a computing resource service provider, such as a command line interface, a console interface, a web API call, and more. In an embodiment, a client 102 can select a set of default training parameters or customize the values of one or more training parameters. In an embodiment, a custom option includes an evaluation setting wherein a client can choose to have a computing resource service provider reserve a portion of the input data as evaluation data 114 to evaluate the quality of a machine-learning model 118 generated by the machine-learning algorithm. In an embodiment, a custom option comprises a recipe that indicates to a computing resource service provider which attributes and attribute transformations are available for training. In an embodiment, the training parameters or hyperparameters control one or more properties of a training process and of the resulting machine-learning model 118. In an embodiment, when a client 102 sends a request to create a machine-learning model, the computing resource service provider selects a particular type of machine-learning algorithm to use based on the attribute type of the target attribute (e.g., the attribute type of the correct answers supplied as part of the data source). For example, if the target attribute type is a binary type (e.g., TRUE/FALSE, zero/one, and so on), then the computing resource service provider creates a binary classification model that utilizes a logistic regression algorithm. In an embodiment, if the target attribute is one of multiple categories, the computing resource service provider creates a multiclass classification model which uses a multinomial logistic regression algorithm, and if the target attribute is a numeric value (e.g., an integer or real number), the computing resource service provider creates a regression model which uses a linear regression algorithm.

In an embodiment, before a machine-learning module 108 creates a machine-learning model, a client creates and/or specifies two data sources—one for training the machine-learning model and one for evaluating the model—for example, a single data source is partitioned into two non-overlapping subsets wherein the first subset is used to train the model and the second subset is used to evaluate the accuracy of the model. In an embodiment, a machine-learning model is created using predefined options or custom options that are specifiable by a client. In an embodiment, evaluating a model is performed by withholding some data from a training process and, after a machine-learning model is generated from the training process, providing at least some of the withheld data to the machine-learning model, receiving a predicted result from the model, and determining whether the result predicted by the model matches an expected result. The withheld data, in an embodiment, is the evaluation data 114 illustrated in FIG. 1.

For example, in an embodiment, the training parameter configuration module 106 of the data analytics service selects a set of initial values for a hyperparameter of and provides the initial values to the machine-learning module 108. The machine-learning module, in an embodiment, runs a machine-learning algorithm for one epoch (e.g., one iteration) for each of the initial values selected to generate an intermediate model 110 which, in some cases, is refined in subsequent iterations to produce the machine-learning model 118. In an embodiment, after the training is complete for the first epoch, the information 116 obtained from the hyperparameters is stored and, subsequently, the system uses a Bayesian optimization algorithm to generate new suggestions for hyperparameter values. In an embodiment, the Bayesian optimization search incorporates the stored information 116 from the first epoch to generate the new suggestions. In an embodiment, the Bayesian optimization algorithm suggests a fixed number of suggestions of new parameters to look for, and the process is repeated until a plateau is reached in the training, and the process is reset, a new set of initial values is randomly selected, and the training process continues until an equilibrium is reached in the training process. In an embodiment, various components illustrated in FIG. 1 such as the client 102 and data analytics service 104 are implemented in the context of a computing resource service provider such as those described in connection with FIG. 6.

Figure 2:
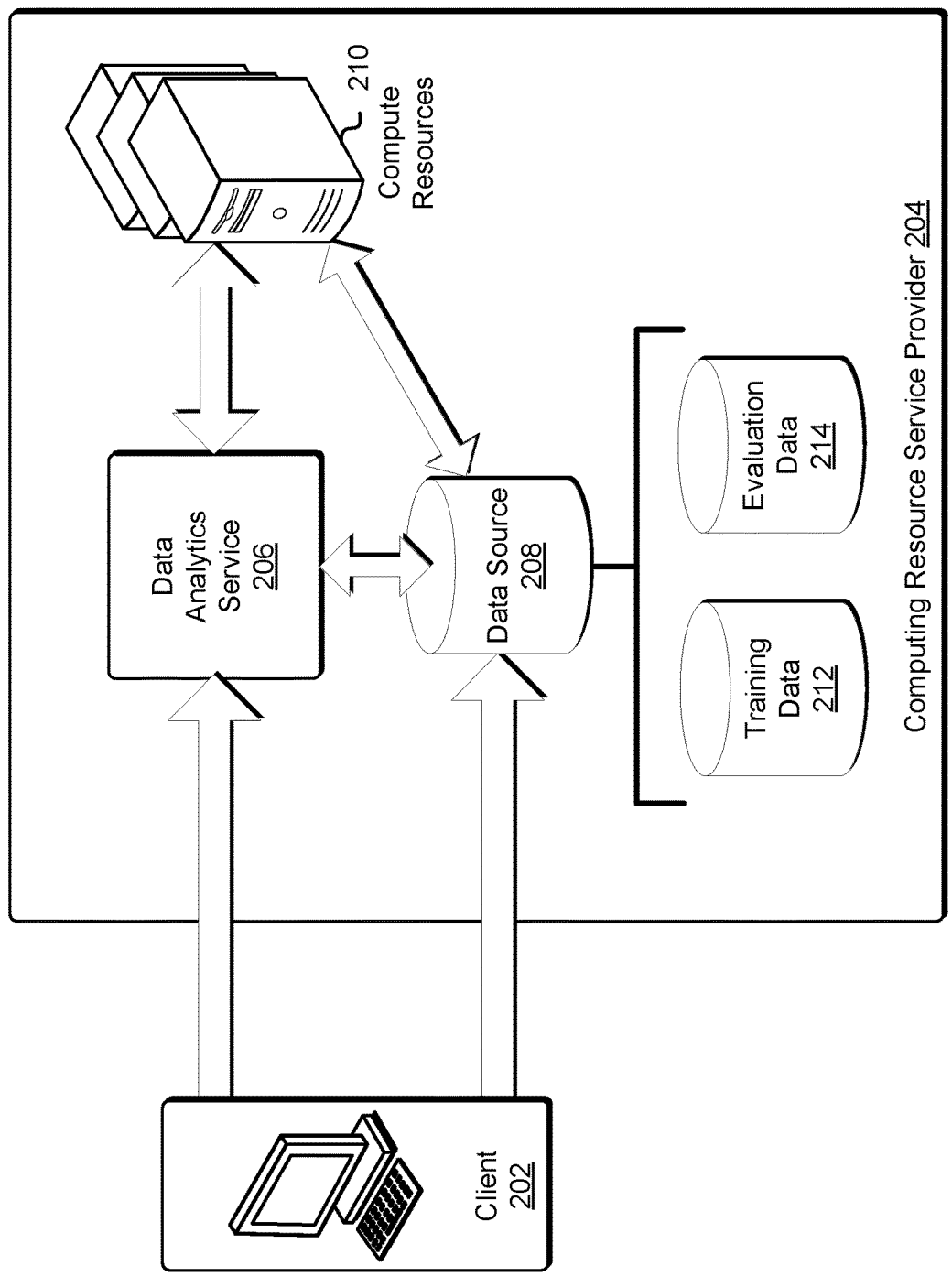
FIG. 2 illustrates a diagram of a system that implements various aspects of the present disclosure in accordance with an embodiment.

In an embodiment, FIG. 2 illustrates a diagram of a system 200 in which an embodiment in accordance with this disclosure can be implemented. In an embodiment, the computing resource service provider 204 is a service provider that provides various services to clients (e.g., the client 202 computing device illustrated in FIG. 2) of the service such as storage-related services (e.g., storing and retrieving large amounts of data), compute resource related services (e.g., providing computing resources to perform requested tasks), data analytics related services (e.g., services related to machine-learning), and more. In an embodiment, any suitable computing system such as a compute service of a computing resource service provider 204 dynamically tunes training one or more parameters (also referred to as hyperparameters) used to train a machine-learning model. In an embodiment, the system includes executable code that, if executed on one or more processors, causes the one or more processors to receive instructions to generate a machine-learning model—for example, a client of a data analytics service 206 of a computing resource service provider 204 that provides services for data analysis, predictive analytics, etc., receives a web application programming interface (API) call from the client to request the analysis of collected data to generate a machine-learning model to be utilized to find patterns in collected data. The patterns, in an embodiment, are utilized to generate a machine-learning model that predicts future behavior and are utilized to improve predictions of whether customers of will purchase certain items based on previous purchasing history, generate better forecasts for the demand of products, and more. In an embodiment, the computing resource service provider includes a suite of services that provide various types of services, such as compute services (e.g., a fleet of servers that are configured to run tasks in a virtualized computing environment), storage services, data analytics services, and any combination thereof, in addition to other services, such as those described elsewhere in connection with FIG. 6.

In an embodiment, a data analytics service 206 is one or more computing devices of a computing resource service provider that performed processes or portions thereof to perform machine-learning algorithms such as a machine-learning algorithm to generate a machine-learning model. In an embodiment, the data analytics service is a frontend service of a computing resource service provider that supports a set of web API requests. In an embodiment, the data analytics service supports the API request by fulfilling the request in full, whereas in other cases, the data analytics service sometimes coordinates with other services of a computing resource service provider to fulfill the request—for example, the data analytics service 206 coordinates with a data storage service to access a data source 208 such as those discussed in connection with FIG. 2. A data analytics service 206 of the computing resource service provider 204, in an embodiment, receives a request (e.g., a web API call) to generate a prediction or a predictive model, and identifies one or more training parameters (also referred to as hyperparameters) to dynamically tune during a training process of a machine-learning model. In an embodiment, a client specifies one or more hyperparameters to tune either explicitly (e.g., encoded as part of a web API request) or implicitly (e.g., a predefined set of hyperparameters are dynamically tuned by default, unless otherwise specified in the web API request). The request, in an embodiment, includes a first value or set of values to initialize a hyperparameter to. In an embodiment, a first set of values is selected in a random, pseudo-random, or quasi-random manner.

The client 202, in an embodiment, is a client computing device that supplies a data source 208 that includes a collection of multiple data points that include a set of inputs and corresponding outputs, which may also be referred to as results. In an embodiment, the client provides the data source 208 to a data storage service of the computing resource service provider 204 that stores the data source 208 in any suitable manner, such as in one or more hard disk drives, and is accessed by other services of the computing resource service provider (e.g., the data analytics service 206 illustrated in FIG. 2) via the data storage service. In an embodiment, the data source 208 is partitioned into two mutually exclusive subsets that are, respectively, training data 212 for training a machine-learning model and evaluation data 214 for evaluating the quality of the model. The quality of a model, in an embodiment, is defined by how accurate a machine-learning model generated at least in part from the training data 212 is at predicting the result of the evaluation data 214 given inputs of data of the evaluation data. In an embodiment, the client specifies a shuffle type to mix the order of in which the training data 212 is encountered by the machine-learning algorithm. In an embodiment, a client can specify the ratio and/or distribution of data of the data source 208 as between the training data 212 and evaluation data 214.

In an embodiment, a first set of input values for a hyperparameter are randomly selected (e.g., selected based on a uniform distribution across a range of possible values) and are used to configure a first iteration of a training run of a machine-learning algorithm to produce a machine-learning model as an output. The machine-learning model is generated by using the training data 212 (e.g., obtained from a location of a data storage service specified by a client) in connection with the hyperparameter. In an embodiment, the training is performed over a first epoch that is defined based on a number of iterations and/or time taken to generate the model (e.g., an epoch can be defined based on an amount of time T to run the model or a number of iterations N to run the machine-learning algorithm). In an embodiment, the training is performed for one epoch for each value of the set of randomly selected hyperparameter values, and the outputs of the models for each of the values are stored—it should be noted that in this context the outputs can refer to the machine-learning model generated after running the machine-learning algorithm for one epoch, the accuracy of the model as measured against the evaluation set, and any other type of data generated from the first epoch to be utilized by a sequential model-based optimization algorithm such as a Bayesian optimization algorithm or grid search algorithm to select a hyperparameter value. In an embodiment, a distributed system uses a set of compute resources 210 (e.g., multiple servers of a computing resource service provider 204) to generate the outputs in parallel. In an embodiment, the compute resources are provided as a compute service of the computing resource service provider wherein the data analytics service 206 indicates to the compute service to utilize one or more compute resources 210 to perform a particular worker function that is one or more steps of the machine-learning algorithm. A compute resource 210, in an embodiment, is a computer server, a virtual machine, and various other types of computing devices with processing units.

In an embodiment, the outputs for the various hyperparameter values are stored, such as in the form of an in-memory data structure in RAM of a computer system such as a server that coordinates multiple worker devices that generate outputs in parallel, in a hard disk drive or other suitable persistent storage device of a data storage service of a computing resource service provider 204. Some or all of the outputs, in an embodiment, are used by a Bayesian optimization algorithm to determine a new value of the hyperparameter—it should be noted that any sequential model-based optimization algorithm can be utilized in place of a Bayesian optimization algorithm, and further noted that the algorithm is able to utilize outputs of a high-accuracy model generated from one hyperparameter value as well as outputs of a low-accuracy model generated from another hyperparameter value. For example, in an embodiment, a grid search algorithm is utilized to generate suggestions.

Regardless, in an embodiment, the data analytics service 206 utilizes compute resources 210 to run a Bayesian optimization algorithm that generates one or more suggested hyperparameter values based on outputs generated from running a machine-learning algorithm for one epoch (e.g., a first portion among many of a machine-learning process) and modifies the hyperparameter to the suggested value for a second epoch subsequent to the first epoch—in some cases, a machine-learning process runs for two epochs (i.e., the first epoch using randomly selected values and the second epoch using suggested values from a Bayesian optimization algorithm), and in some cases, the process runs for several epochs in which subsequent outputs are used by the optimization algorithm to iteratively generate more refined suggestions for the hyperparameter values. In an embodiment, a training process of a machine-learning model is resumed after the first epoch with the same training data 212, but utilizes the hyperparameter values supplied by the optimization algorithm instead of the initially selected values to generate a machine-learning model. In this context, the hyperparameter can also be referred to as a training parameter or an optimization parameter. In an embodiment, various components illustrated in FIG. 2 such as the client 202, computing resource service provider 204, data analytics service 206, data source 208, and compute resources 210 are implemented in the context of a computing resource service provider described in connection with FIG. 6.

Figure 3:
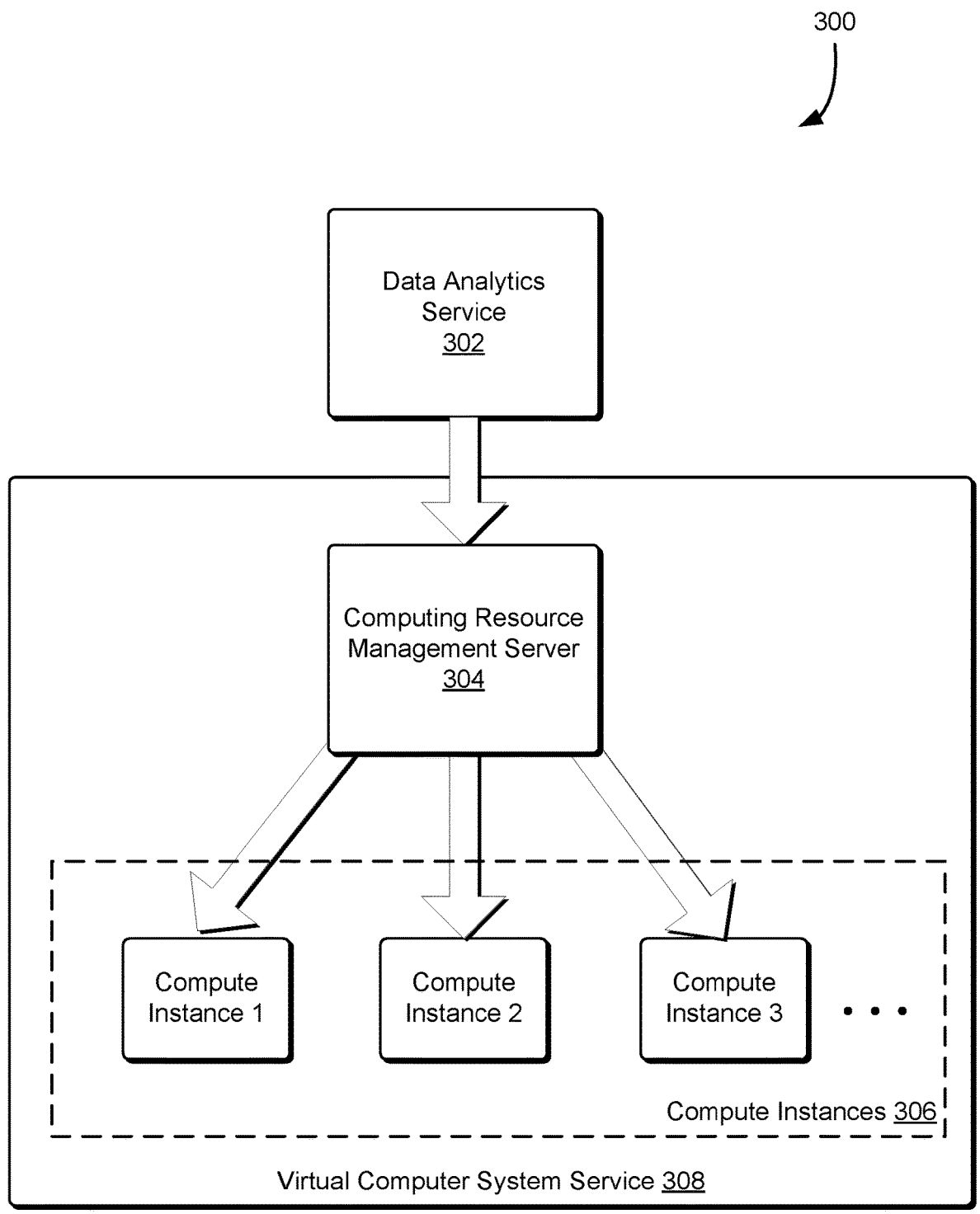
FIG. 3 illustrates a diagram of a parallelized system for training a machine-learning model, in accordance with one embodiment.

FIG. 3 illustrates a diagram where a system 300, in an embodiment, dynamically tunes training parameters during the training process of a machine-learning algorithm in a parallelized computing environment. In an embodiment, the system is implemented using one or more services of a computing resource service provider—for example, a data analytics service utilizes one or more compute instances (e.g., virtual machine instances) of a compute service.

Figure 6:
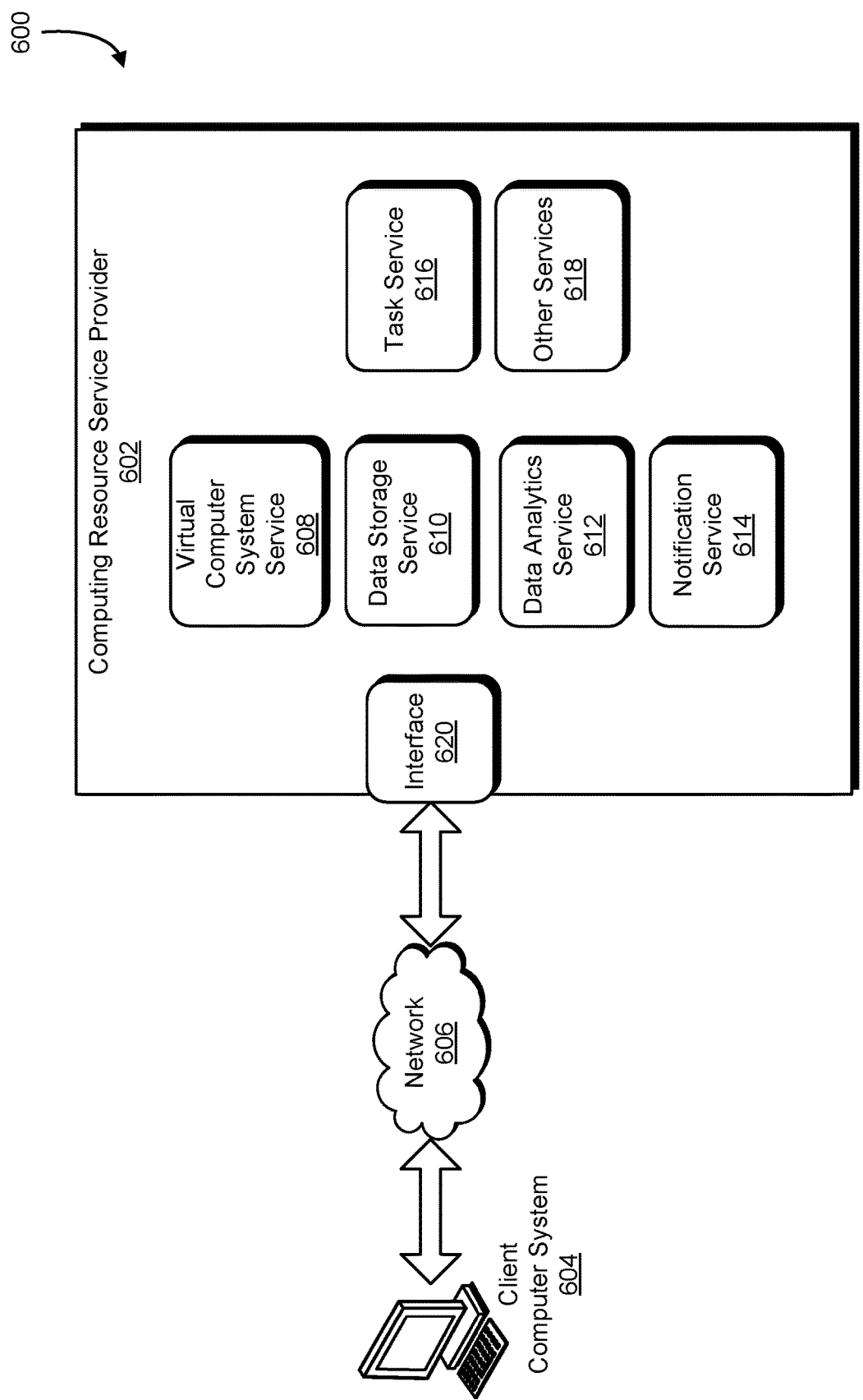
FIG. 6 illustrates a system in which various embodiments can be implemented, in accordance with one embodiment.
Figure 7:
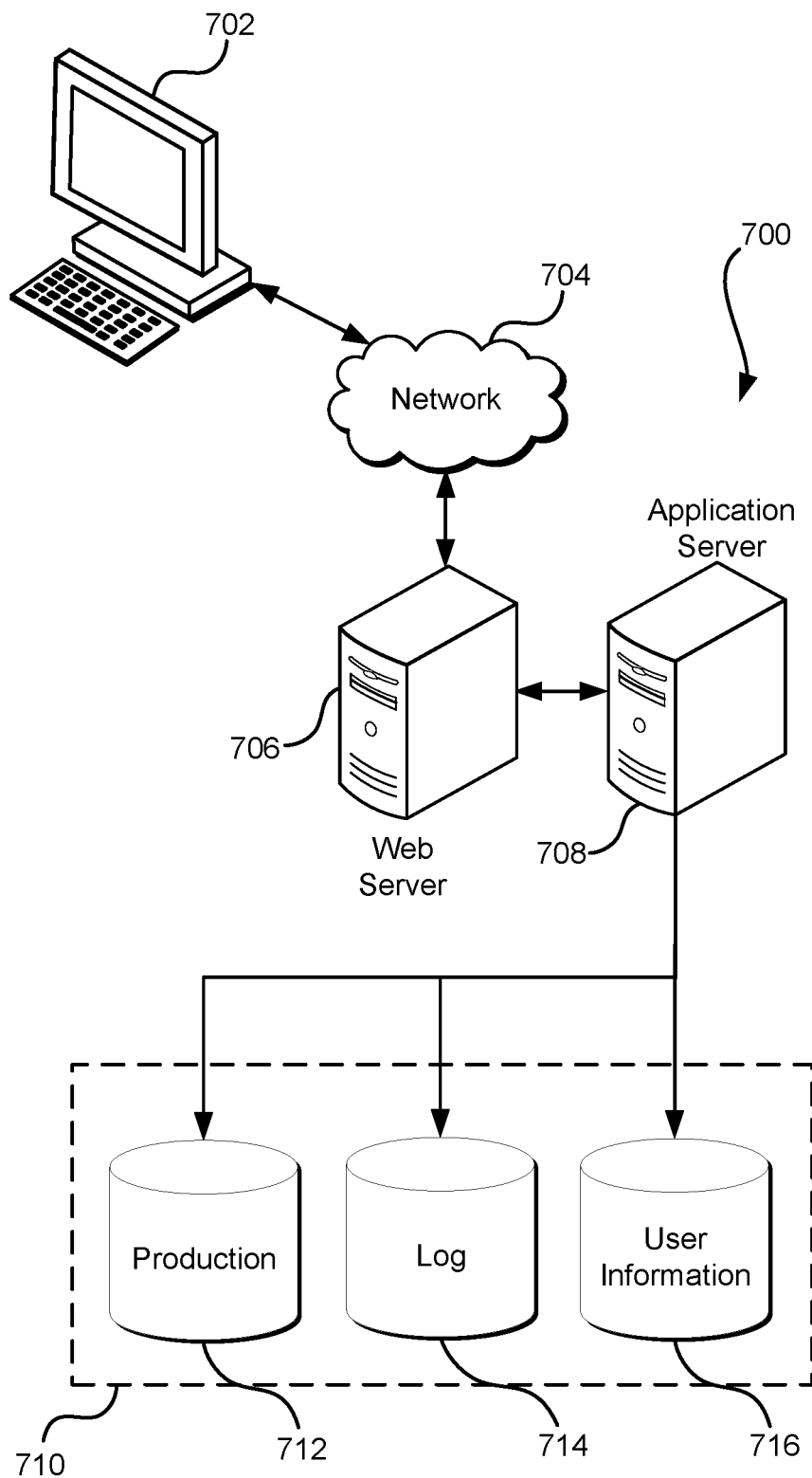
FIG. 7 illustrates a system in which various embodiments can be implemented, in accordance with one embodiment.

In an embodiment, a data analytics service 302 is implemented in accordance with those described elsewhere, such as in connection with FIGS. 1, 2, and 7. In an embodiment, the data analytics service 302 includes executable code that, when executed on one or more processors of a computer system, causes the one or more processors to provide instructions to tune hyperparameter values that are used to control the training of a machine-learning model. As a second example, the data analytics service 302 includes executable code in the form of a dynamic-linked library (DLL), static library, and the like that is loaded by a process running on a computer system and, if the executable code is executed on one or more processors of the computer system, cause the computer system to implement at least part of one or more processes described in this disclosure, such as processes or portions thereof described in connection with FIGS. 4 and 5. In an embodiment, the data analytics service 302 receives one or more instructions (e.g., as a request or an API call) to modify one or more training parameters that control a training process of a machine-learning algorithm, which may be received in accordance with embodiments such as those described in connection with FIGS. 1, 2, and 4-6.

In an embodiment, a virtual computer system service 308 is a collection of computing resources configured to instantiate virtual machines on behalf of the client such as the data analytics service 302. In an embodiment, different virtual machines can be provisioned with different executable code to perform different tasks—in an embodiment, a first virtual machine or set of virtual machines is provisioned to execute tasks in connection with coordinating a parallelized task (e.g., reduce operations of a map-reduce framework) and a different set of virtual machines is provisioned to perform a series of parallelizable tasks (e.g., map operations of a map-reduce framework). It should be noted that, in an embodiment, different virtual machines are executed on the same computer hardware devices. In an embodiment, the virtual computer system service 308 is implemented in accordance with an embodiment described elsewhere in connection with FIGS. 6 and 7.

In an embodiment, a computing resource management server 304 is a software application or module running on a computer system that coordinates the management of computing resources such as compute instances that are used in the training of a machine-learning model. In an embodiment, the machine-learning management service 302 and the computing resource management server 304 are separate components—for example, the computing resource management server 304 is a component of a compute service of a computing resource service provider operating on a first fleet of computing devices and the data analytics service is a separate service of the computing resource service provider operating on a second fleet of computing devices different from the first fleet, but such need not be the case—the data analytics service 302 and computing resource management server 304 can be implemented as components of a single application and/or service. In an embodiment, the computing resource management server 304 is a component that allocates and/or coordinates work performed by one or more compute instances 306. In an embodiment, the compute instances 306 are any hardware or software that is capable of running executable instructions, such as one or more steps of a machine-learning algorithm. In an embodiment, a training of a machine-learning model has one or more steps that are executed in parallel—for example, a training performed in accordance with a map-reduce framework in which parallel operations of a mapping function are performed by the compute instances 306 and the reduce function is performed at least in part by the computing resource management server 304. In an embodiment, the computing resource management server 304 receives instructions from the machine-learning management service 302 to allocate computing resources via a message, API call, or notification. In an embodiment, a notification service such as those described in connection with FIG. 6 is utilized by the machine-learning management service 302 and/or the computing resource management server 304 to communicate.

As an example, the data analytics service 302, in an embodiment, provides to the computing resource management server 304 an initial value for a hyperparameter relating to the usage of computing resources such as the number of compute instances to utilize as part of the training process. Continuing with the example, the computing resource management server 304 receives the hyperparameter value and performs appropriate steps to initialize computing resources such as compute instances 306 in accordance with the received hyperparameter value (e.g., the computing resource management server 304 accesses a hypervisor to instantiate an appropriate number of virtual machine instance), and provides instructions to perform at least some steps in connection with the learning process (e.g., steps that are amenable to being parallelized in a map-reduce framework). In an embodiment, a map-reduce framework is used to parallelize tasks among the compute instances 306 (e.g., as part of a map operation) and the results are collected and summarized by the computing resource management server 304 (e.g., as part of a reduce operation). In an embodiment, the results are collected by the computing resource management server 304 and recorded to a data storage service and/or provided directly to the data analytics service 302 (e.g., via a message). In either case, the data analytics service 302 obtains the results and uses them to generate a new value for the hyperparameter using a Bayesian optimization algorithm, and provides the new value to the computing resource management server 304 which then adjusts the compute resources based on the new hyperparameter value (e.g., by initializing additional virtual machine instances or de-initializing existing virtual machine instances). In an embodiment, various components illustrated in FIG. 3 are implemented in the context of a computing resource service provider, such as those described in connection with FIG. 6.

Figure 4:
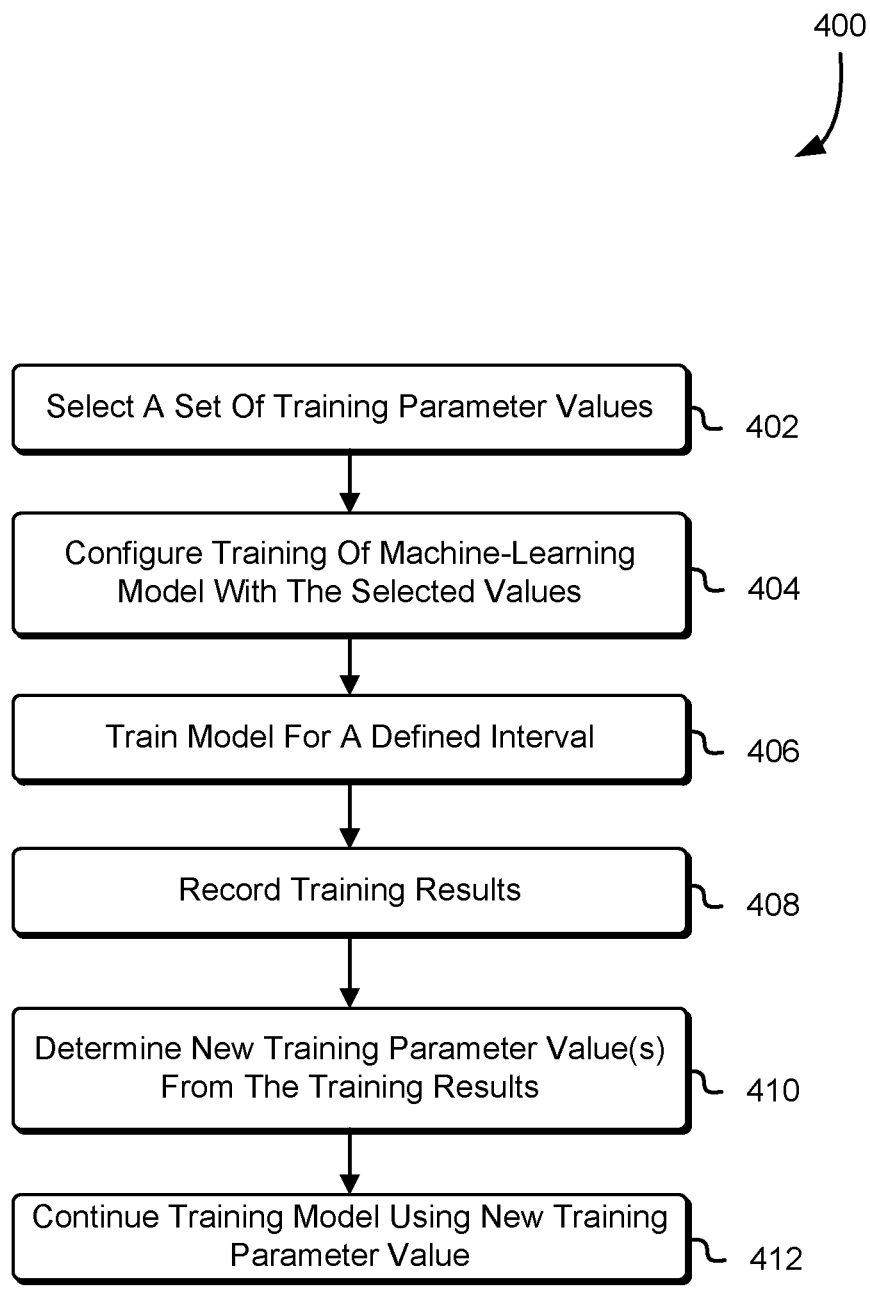
FIG. 4 illustrates the process for dynamically tuning training parameters of a machine-learning algorithm, in accordance with one embodiment.

FIG. 4 shows an illustrative example of a process that, as a result of being performed by a suitable system, dynamically tunes training parameters of a machine-learning algorithm. The process illustrated in the flowchart 400 may, generally speaking, be performed by any suitable computing entity such as by a data analytics service of a computing resource service provider, a compute instance that runs a worker routine on behalf of a data analytics service, a server computer system, and more. In an embodiment, the process illustrated in FIG. 4 is performed in accordance with system described in connection with FIGS. 1-3.

In an embodiment, a suitable system includes executable code that, if executed by one or more processors, causes the one or more processors to select 402 a set of training parameter values. In an embodiment, the training parameters—also referred to as hyperparameters—are selected in a random, pseudo-random, or quasi-random manner. A pseudo-random number can be generated using a pseudo-random number generator that selects a seed value (e.g., based on the current time) which deterministically generates an output such that the same seed value always generates the same output. A quasi-random number can be generated using a low-discrepancy sequence such as a Sobol sequence, Hammersley set, Halton sequence, Poisson disk sampling, and more. The set, in an embodiment, is of a fixed size that is defined by the client, is defined by the system (e.g., by a data analytics service that a client computer system accesses via a web API call or request). In an embodiment, the training parameter is an optimization hyperparameter that controls at least one aspect of the training of a machine-learning algorithm.

In an embodiment, a data analytics service includes a server that configures 404 the training of a machine-learning model with the selected training parameter values as described above in connection with step 402. In an embodiment, the training parameters are optimization hyperparameters of a machine-learning algorithm that is used to control the training of a machine-learning model. In an embodiment, the system trains 406 a machine-learning model for a defined interval. A defined interval, in an embodiment, is defined based on the amount of computational resources used, the amount of time the algorithm uses, a number of iterations, or any combination thereof. In an embodiment, a neural network is trained for one epoch (e.g., one training run) and the results for the training run using each respective hyperparameter value are recorded 408 in any suitable manner, such as in RAM (e.g., an in-memory cache) or stored in a hard disk drive or in a data storage service of a computing resource service provider. In an embodiment, the training results recorded include input parameters used to train the model, such as the hyperparameter value, the value of other training parameters (e.g., those that are held constant), the machine-learning model generated after the first epoch, the quality of such a model, and more.

In an embodiment, the system records the training results for each of the initial hyperparameter values selected and uses the recorded training results to determine 410 new training parameter values. In an embodiment, new training parameter values are determined by using a Bayesian optimization algorithm to evaluate the training results from the initial set of training parameter values and generating suggested values based on those results. It should be noted that, in an embodiment, the optimization algorithm generates the suggestion based at least in part on results obtained from good training parameter values (e.g., those that are able to predict the results of the evaluation data with high accuracy) as well as results obtained from poor training parameter values (e.g., those that predict the results of the evaluation data with low or relatively lower accuracy).

In an embodiment, the system continues 412 training the machine-learning model using the new training parameter value (e.g., the value or values suggested by the Bayesian optimization algorithm executed in connection with step 410). In an embodiment, the system runs for a first epoch with hyperparameter values selected pseudo-randomly, modifies the hyperparameter values based on suggestions determined from a Bayesian optimization algorithm, modifies the hyperparameter values based on the suggestions, and completes the training run with the suggested value.

Figure 5:
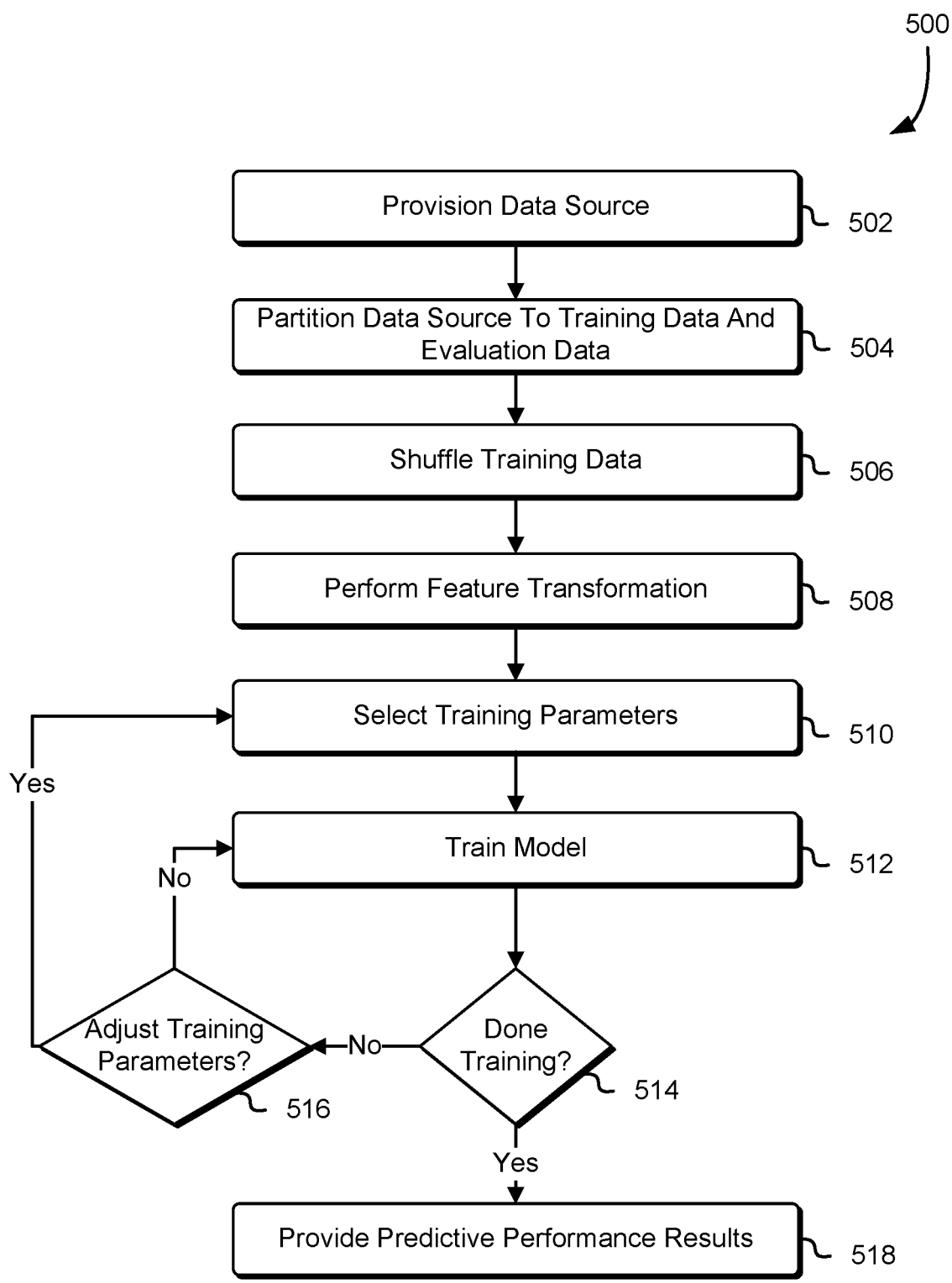
FIG. 5 illustrates the process for provisioning and generating a machine-learning model in accordance with at least one embodiment, in accordance with one embodiment.

FIG. 5 shows an illustrative example of a process that, as a result of being performed by a suitable system, implements provisioning and generating a machine-learning model in accordance with at least one embodiment. The process illustrated in the flowchart 500 may, generally speaking, be performed by any suitable computing entity such as by a data analytics service of a computing resource service provider, a server computer system, and more. In an embodiment, the process illustrated in FIG. 5 is performed in accordance with system described in connection with FIGS. 1-3.

In an embodiment, a suitable system such as a service of a computing resource service provider includes executable code that, if executed by one or more processors, causes the one or more processors to provision 502 a data source. In an embodiment, provisioning the data source includes gathering or collecting data to be utilized by a machine-learning algorithm as part of a training process, which includes inputs and outputs to a machine-learning model. For example, an input is a user's shopping behavior for some products, and an output is a result of whether the user also purchased another product. In an embodiment, the data source is uploaded to a data storage service of the computing resource service provider. In an embodiment, the collected data is organized to a set of inputs and a set of outputs or results, which a machine-learning algorithm generates predictions for. In an embodiment, the data source is stored in a data storage service of a computing resource service provider to be accessed by a data analytics service such as in the manner described elsewhere in this disclosure, such as in connection with FIG. 2.

In an embodiment, the system partitions 504 the data source into two mutually exclusive subsets, a first subset being selected as training data to be used as part of a training process to create a machine-learning model and a second subset being selected as evaluation data that is used to evaluate the quality of various models that are generated. In an embodiment, a client provides a set of data and some data of the set is selected for training the model and some of the data is selected for evaluating the model. In an embodiment, the client provides a first set of data that is to be used as the training data and provides a second set of data that is to be used as the evaluation data. In an embodiment, a single set of data is partitioned in accordance with a ratio that is specified by the client, a data analytics service, or other suitable system.

The system performing the process, in an embodiment, shuffles 506 the training data so that the machine-learning algorithm used to train the model does not encounter just one type of data for a large number of observations in succession. In an embodiment, the shuffling is performed by re-ordering a list of collected data entries in a random, pseudo-random, or quasi-random manner, selecting entries of the training data in a random, pseudo-random, or quasi-random order (i.e., as opposed to sequentially accessing data entries of an unshuffled data set). In an embodiment, the shuffle type is specified by a client as part of a web API call. In an embodiment, shuffling is not performed, such as in cases where the data source is provided in a random order.

In an embodiment, the system performs a feature transformation 508. In an embodiment, performing feature transformation refers to organizing data of the data source to a format into a format that is conducive to generalization or pattern detection as performed by a machine-learning algorithm. In an embodiment, the transformation is performed in accordance with a recipe, which is specified in any suitable format, such as in a syntax in accordance with JavaScript Object Notation (JSON) format. In an embodiment, a transformation generates groupings of words, removes punctuation, groups observed values together, normalizes numeric values, or any combination thereof. In an embodiment, the feature transformation step is optional or entirely omitted, such as in the case where numeric data is already normalized as part of the process for collecting the data of the data source.

In an embodiment, the system selects 510 training parameters—also referred to as hyperparameters—for use in connection with a training process of a machine-learning algorithm. In an embodiment, the training parameter is a parameter that controls one or more aspects of a training process used by a machine-learning algorithm to generate a machine-learning model, and is sometimes classified as a structural hyperparameter that defines the structure of the model being generated and an optimization hyperparameter that defines how the weights of the model are tuned. In an embodiment, the optimization hyperparameters include: training parameter includes, in an embodiment, a learning rate for the model, the momentum, regularization type and amount, shuffle type, and more.

In an embodiment, the training parameters are selected in a random, pseudo-random, or quasi-random manner. A pseudo-random number can be generated using a pseudo-random number generator that selects a seed value (e.g., based on the current time) which deterministically generates an output such that the same seed value always generates the same output. A quasi-random number can be generated using a low-discrepancy sequence such as a Sobol sequence, Hammersley set, Halton sequence, Poisson disk sampling, and more. In an embodiment, the system determines a number of initial hyperparameter values to generate and uses any suitable process such as those described above to generate the initial values.

In an embodiment, the system performs 512 part of a training for a machine-learning algorithm. It should be noted that the step illustrated in FIG. 5 is not the entire training of the machine-learning algorithm but rather a portion thereof—for example, the training may be to perform a neural network training run for one epoch using a set of pseudo-randomly selected values for the learning rate hyperparameter. The results of the first epoch may be recorded and stored using a data storage service of a computing resource service provider such as in the manner described elsewhere in this disclosure.

In an embodiment, the system determines whether 514 the training process is completed. Continuing with the previous example, the system determines, after running the training for one epoch, that the training has not completed yet and then adjusts 516 the training parameters. In an embodiment, the training parameters are adjusted by obtaining the outputs generated after running the neural network for one epoch and using those output to generate a recommended value using a Bayesian optimization algorithm. Generally speaking, any sequential model-based optimization algorithm can be utilized in place of the Bayesian optimization algorithm. The outputs can, for example, be the quality of the model generated with a particular learning rate, and the Bayesian optimization algorithm utilizes the quality of models generated by various learning rates to generate suggestions for modifying the learning rate value. Generally speaking, while the example discusses learning rates, any suitable optimization hyperparameter can be utilized in the same or similar manner as discussed in connection with the learning rate. The system, in an embodiment, resume the training of the model for a second epoch using the suggested values obtained from the optimization algorithm and runs until completion, which can include several additional epochs of training. In an embodiment, the system provides 518 the predictive performance results, which includes, in an embodiment, the machine-learning model, an evaluation of the model, and weights for one or more edges as between nodes of the model (e.g., between two different nodes or from a node to itself). In an embodiment, a client receives the results and determines whether to further adjust one or more hyperparameters to improve the quality of the training in subsequent training runs.

FIG. 6 shows an example diagram of a system 600 illustrating a client 604 connected to a computing resource service provider in accordance with at least one embodiment. The computing resource service provider 602 provides, in an embodiment, a variety of services to the client 604, wherein the client is the owner or user of the client device as illustrated in FIGS. 1-3, and the client 604 communicates with the computing resource service provider 602 via an interface 620, which is a web services interface or any other type of client interface. While FIG. 6 shows one interface 620 for the services of the computing resource service provider 602, each service, in an embodiment, has its own interface and, generally, subsets of the services are configured to have corresponding interfaces in addition to or as an alternative to the interface 620. As shown in FIG. 6, the client 604, in an embodiment, is a computing system such as a computer that includes executable code that, if executed by one or more processors of the computing system, causes the one or more processors to communicate with the computing resource service provider 602 through a network 606, whereby the network 606 is a communication network, such the Internet, an intranet or an Internet service provider (ISP) network. Some communications from the client 604 to the computing resource service provider 602, in an embodiment, cause the computing resource service provider 602 to operate in accordance with one or more embodiment described herein or a variation thereof.

In an embodiment, the computing resource service provider 602 is a collection of computer servers connected via a network (e.g., an intranet) and configured with executable code that, if executed by one or more processors of the servers, causes the one or more processors to provide various computing resource services to its client such as a virtual computer system service 608, a storage service 610, a data analytics service 612, a notification service 614, a task service 616 and one or more other services 618. It is noted that not all embodiments described herein include the services 608-618 described with reference to FIG. 6, and additional services may be provided in addition to or as an alternative to services explicitly described herein. As described herein, each of the services 608-618 includes, in an embodiment, one or more web service interfaces that enable the client 604 to submit appropriately configured API calls to the various services through web service requests. In addition, each of the services, in an embodiment, includes one or more service interfaces that enable the services to access each other (e.g., to enable a virtual computer system of the virtual computer system service 608 to store data in or retrieve data from the data storage service 610 and/or to enable a data analytics service to provision virtual computer systems).

In an embodiment, the virtual computer system service 608 is a collection of computing resources configured to instantiate virtual machines on behalf of the client 604. The client 604, in an embodiment, interacts with the virtual computer system service 608 (via appropriately configured and authenticated API calls) to provision and operate virtual computer systems that are instantiated on physical computing devices hosted and operated by the computing resource service provider 602. The virtual computer systems may be used for various purposes, such as to operate as to perform one or more steps of a machine-learning algorithm specified by a data analytics service. In an embodiment, the virtual computer system service 608 supports the initialization of a fleet of virtual machine instances to run a set of operations in accordance with a map-reduce framework, such as in the manner discussed in connection with FIG. 3. Other applications for the virtual computer systems may be to support database applications, electronic commerce applications, business applications and/or other applications. Although the virtual computer system service 608 is shown in FIG. 6, any other computer system or computer system service may be utilized in the computing resource service provider 602, such as a computer system or computer system service that does not employ virtualization or instantiation and instead provisions computing resources on dedicated or shared computers/servers and/or other physical devices.

In an embodiment, the data storage service 610 comprises one or more computing resources that collectively operate to store data for a client 604 and includes one or more processors, executable code that can be executed by the one or more processors, and one or more storage devices such as hard disk drives. For example, a block-level storage service is a type of data storage service that uses block-level storage devices (and/or virtualizations thereof). More generally speaking, a data storage service, in an embodiment, includes executable code that, if executed by one or more processors of a computer system, causes the computer system to coordinate the storage of data among one or more data storage devices. For example, a data storage service, in an embodiment, is operationally attached to virtual computer systems provided by the virtual computer system service 608 to serve as logical units (e.g., virtual drives) for the computer systems. In an embodiment, a data source that is utilized in a machine-learning algorithm is stored at least in part in a data storage service. In an embodiment, training data and evaluation data utilized in accordance with embodiments described in connection with FIGS. 1-3 are stored in and accessible via a data storage service 610.

In an embodiment, the computing resource service provider 602 further includes a data analytics service 612 that includes a collection of one or more computing systems such as a fleet of computer servers and/or virtual machines that store executable code which, if executed by one or more processors of the fleet, cause the one or more processors to perform various operations related to machine-learning, data analysis, pattern recognition, generating data-driven analysis, and more. In an embodiment, the data analytics service 612 is implemented in accordance with those described elsewhere in this disclosure, such as in connection with FIGS. 1-5. In an embodiment, the data analytics service 612 exposes an interface accessible to other services of the computing resource service provider that is not accessible to components outside of the computing resource service provider 602, such as the client computer system 604.

In an embodiment, a notification service 614 is one or more computer system that include executable code that, if executed by one or more processors associated with the notification service, cause the one or more processors of the notification service to provide notifications to clients using a "push" mechanism without the need to periodically check or "poll" for new information and updates. The notification service 614, in an embodiment, is further used for various purposes such as monitoring applications executing in the virtual computer system service 608, workflow systems, time-sensitive information updates, mobile applications and many others. In an embodiment, a notification service 614 dispatches notifications that a training run of a machine-learning algorithm has completed, one or more hyperparameter values have changed, one or more results of a training of a machine-learning algorithm are stored and available to retrieval, and more.

The computing resource service provider 602, in an embodiment, is also equipped with a task service 616. The task service 616, in an embodiment, includes one or more computer systems that store executable code that, if executed by one or more processors of the computer systems associated with the task service, cause the one or more processors to receive a task package from the client 604 and enable executing tasks as dictated by the task package. The task service 616, in an embodiment, is configured to use any resource of the computing resource service provider 602, such as one or more instantiated virtual machines or virtual hosts, for executing the task. The task service 618 may configure the one or more instantiated virtual machines or virtual hosts to operate using a selected operating system and/or a selected execution application in accordance with a requirement of the client 604. In an embodiment, the task service 618 divides a task into constituent components and allocates resources to perform tasks associated with each of the constituent components. For example, in an embodiment, the task service 616 receives a machine-learning task, divides the task into a set of map operations and reduce operations in accordance with a map-reduce framework and initializes a plurality of virtual machine instances (e.g., in accordance with a hyperparameter indicating the maximum number of cost of computing resources to utilize) to perform the map operations and configures another virtual machine instance (or multiple instances) to perform the reduce operation.

In an embodiment, the computing resource service provider 602 additionally maintains one or more other services 618 based at least in part on the needs of its clients 604. For instance, the computing resource service provider 602 may maintain a database service for its clients 604. A database service may be a collection of computing resources that collectively operate to run one or more databases for one or more clients 604. The client 604 may operate and manage a database from the database service by utilizing appropriately configured API calls. This, in turn, may allow a client 604 to maintain and potentially scale the operations in the database. Other services include but are not limited to object-level archival data storage services, services that manage and/or monitor other services and/or other services.

FIG. 7 illustrates aspects of an example system 700 for implementing aspects in accordance with various embodiments. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices or virtual computer systems and refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. The application server can include any appropriate hardware, software and firmware for integrating with the data store as needed to execute aspects of one or more applications for the client device, handling some or all of the data access and business logic for an application. In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which is used to serve content for the production side. The data store also is shown to include a mechanism for storing log data 714, which is used, in an embodiment, for reporting, analysis or other such purposes. In an embodiment, other aspects such as page image information and access rights information are stored in the data store in any of the above listed mechanisms as appropriate or in additional mechanisms in the data store 710. The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content.

In an embodiment, each server typically includes an operating system that provides executable program instructions for the general administration and operation of that server and includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular, wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   initializing, by a computer system, a hyperparameter to a first value, wherein the hyperparameter controls at least part of a training process for generating a machine-learning model;
   calculating, by the computer system, a first output of an iteration of the training process based at least in part on applying a first value of the hyperparameter and training data to a machine-learning algorithm;
   selecting, based at least in part on the first output of the iteration of the training process, a second value for the hyperparameter from a plurality of hyperparameters values to modify, by the computer system, the hyperparameter; and
   calculating, by the computer system, a second output of a subsequent iteration of the training process, wherein the second output is calculated based at least in part on the second value of the hyperparameter.

2. The computer-implemented method of claim 1, further comprising calculating the second output based at least in part on applying a Bayesian optimization algorithm to the first output.

3. The computer-implemented method of claim 1, wherein the machine-learning model comprises a neural network.

4. The computer-implemented method of claim 1, further comprising:
   allocating, by the computer system, a set of computing resources based on detecting that the hyperparameter is modified to the second value; and
   wherein the calculating of the second output is performed using the set of computing resources.

5. A system, comprising:
   one or more processors; and
   memory that stores computer-executable instructions that, as a result of being executed, cause the one or more processors to:
   initiate a training of a machine-learning model with one or more hyperparameters for the training having at least a first value, the training to determine a set of parameters for the machine-learning model;
   calculate output of the training; and
   change the one or more hyperparameters of the training by applying a second value from a plurality of hyperparameter values during the training based at least in part on the output.

6. The system of claim 5, wherein the instructions to change the one or more hyperparameters of the training to have at least the second value, which if performed by the one or more processors, cause the system to compute the second value based at least in part on a result of a sequential model-based optimization algorithm, the result determined based at least in part on the output of the training.

7. The system of claim 6, wherein the sequential model-based optimization algorithm is a Bayesian optimization algorithm.

8. The system of claim 5, wherein:
the first value of the one or more hyperparameters corresponds to an amount of computing resources to utilize to calculate outputs of the training;
the second value of the one or more hyperparameters indicating a different amount of computing resources to utilize to calculate outputs of the training; and
the instructions, which if performed by the one or more processors, further cause the system to allocate computing resources for the training of the machine-learning model, wherein, the computing resources are allocated in response to detecting a change in the one or more hyperparameters from the first value to the second value.

9. The system of claim 8, wherein the computing resources comprise virtual machine instances.

10. The system of claim 5, wherein the one or more hyperparameters comprises an optimization hyperparameter that controls at least part of the training of the machine-learning model.

11. The system of claim 10, wherein the optimization hyperparameter is a learning rate hyperparameter.

12. The system of claim 5, wherein:
the instructions, which if performed by the one or more processors, further cause the system store a plurality of outputs of the training generated at least in part by using the one or more hyperparameters; and
the instructions to change the one or more hyperparameters of the training to have the second value, which, if performed by the one or more processors, further causes the system to change the one or more hyperparameters based at least in part on the plurality of outputs.

13. A non-transitory computer-readable storage medium having stored thereon executable instructions that, as a result of being executed by one or more processors of a computer system, cause the computer system to at least:
select a first value for one or more hyperparameters to control training of a machine-learning model, the training to determine a set of parameters for the model;
calculate an output of the training; and
during the training, determine a second value from a plurality of values and change the one or more hyperparameters to have the second value determined based at least in part on the output.

14. The non-transitory computer-readable storage medium of claim 13, wherein the one or more hyperparameters comprises an optimization hyperparameter.

15. The non-transitory computer-readable storage medium of claim 13, wherein the instructions further comprise instructions that, as a result of being executed by the one or more processors, cause the computer system to:
select a plurality of values for a hyperparameter parameter of the one or more hyperparameters;
for the plurality of values, calculate and store a respective output of the training; and
determine the second value based at least in part on the respective outputs.

16. The non-transitory computer-readable storage medium of claim 15, wherein the instructions that cause the computer system to select the plurality of values further include instructions that cause the computer system to pseudo-randomly select the plurality of values.

17. The non-transitory computer-readable storage medium of claim 13, wherein the instructions further comprise instructions that, as a result of being executed by the one or more processors, cause the system to apply a grid search algorithm to the output to generate the second value.

18. The non-transitory computer-readable storage medium of claim 13, wherein the one or more hyperparameters comprises information usable to determine an amount of computing resources to utilize to calculate the output.

19. The non-transitory computer-readable storage medium of claim 13, wherein the instructions further comprise instructions that, as a result of being executed by the one or more processors, cause the system to:
calculate a second output of the training, wherein second output is calculated using at least the second value of the one or more hyperparameters; and
during the training, change the second value of the one or more hyperparameters to a third value based at least in part on the second output.

20. The non-transitory computer-readable storage medium of claim 13, wherein the machine-learning model comprises a linear regression model or a Bayesian network.

* * * * *